(12) United States Patent
Vudrag (10) Patent No.: US 11,142,467 B2
(45) Date of Patent: Oct. 12, 2021

(54) EVAPORATOR

(71) Applicant: VMACTEK Pty Ltd, Elsternwick (AU)

(72) Inventor: Peter Joseph Vudrag, Caulfield North (AU)

(73) Assignee: VMACTEK Pty Ltd, Elsternwick (AU)

( * ) Notice: Subject to any disclaimer, the term of this patent is extended or adjusted under 35 U.S.C. 154(b) by 0 days.

(21) Appl. No.: 16/635,711

(22) PCT Filed: Aug. 1, 2017

(86) PCT No.: PCT/AU2017/050804
§ 371 (c)(1),
(2) Date: Jan. 31, 2020

(87) PCT Pub. No.: WO2018/039707
PCT Pub. Date: Mar. 8, 2018

(65) Prior Publication Data
US 2021/0139345 A1    May 13, 2021

(30) Foreign Application Priority Data

Aug. 31, 2016   (AU) .................................. 2016903473

(51) Int. Cl.
*C02F 1/12* (2006.01)
*B01D 1/00* (2006.01)
(Continued)

(52) U.S. Cl.
CPC .............. *C02F 1/12* (2013.01); *B01D 1/0047* (2013.01); *B01D 1/06* (2013.01); *B01D 1/14* (2013.01);
(Continued)

(58) Field of Classification Search
CPC .......... C02F 1/048; C02F 1/12; B01D 1/0047; B01D 1/06; B01D 1/14; B01D 1/16; B01D 1/305; F28C 3/08
See application file for complete search history.

(56) References Cited

U.S. PATENT DOCUMENTS 3,370,635 A    2/1968   Kumm
3,748,234 A  * 7/1973   Pottharst, Jr. .......... B01D 1/289
                                                          202/187
(Continued)

FOREIGN PATENT DOCUMENTS

DE    2924505 A1   1/1980
DE    3411675 A1  10/1985
(Continued)

OTHER PUBLICATIONS

International Search Report and Written Opinion dated Sep. 21, 2017 from International Application No. PCT/AU2017/050804 (Authorised officer, Keiara Moodley), 12 pages.
(Continued)

*Primary Examiner* — Jonathan Miller
(74) *Attorney, Agent, or Firm* — MH2 Technology Law Group, LLP (57) ABSTRACT

A process for separating distillate and waste from a water stream comprising: spraying the water stream together with compressed steam through one or more dual phase nozzles down into one or more vertical tubes contained in a shell and tube heat exchanger; evaporating water condensing the distillate; and ejecting the waste.

15 Claims, 6 Drawing Sheets

(51) Int. Cl.
  *B01D 1/06* (2006.01)
  *B01D 1/14* (2006.01)
  *B01D 1/16* (2006.01)
  *B01D 1/30* (2006.01)
  *C02F 1/04* (2006.01)
  *F28C 3/08* (2006.01)
(52) U.S. Cl.
  CPC ............... *B01D 1/16* (2013.01); *B01D 1/305* (2013.01); *C02F 1/048* (2013.01); *F28C 3/08* (2013.01); *C02F 2301/046* (2013.01)

(56) References Cited

U.S. PATENT DOCUMENTS

| | | | | |
|---|---|---|---|---|
| 4,002,538 | A * | 1/1977 | Pottharst, Jr. | B01D 1/289 203/10 |
| 4,269,655 | A | 5/1981 | Broberg et al. | |
| 5,221,439 | A * | 6/1993 | Li | F25C 1/145 202/175 |
| 5,853,549 | A * | 12/1998 | Sephton | F28F 27/02 203/2 |
| 5,968,321 | A * | 10/1999 | Sears | B01D 1/28 202/172 |
| 6,058,623 | A * | 5/2000 | Brooks | B01D 1/10 34/134 |
| 7,422,663 | B2 * | 9/2008 | Costa | B01D 1/26 202/174 |
| 7,611,604 | B2 * | 11/2009 | Salmisuo | B01D 1/0082 159/13.2 |
| 8,210,245 | B2 | 7/2012 | Gillessen et al. | |
| 8,469,091 | B2 * | 6/2013 | Bjorklund | E21B 43/24 166/266 |
| 9,084,976 | B2 * | 7/2015 | Dobry | B01D 1/20 |
| 2002/0038760 | A1 * | 4/2002 | Salmisuo | B01D 1/065 203/10 |
| 2005/0051418 | A1 | 3/2005 | Lama | |
| 2007/0051513 | A1 * | 3/2007 | Heins | E21B 43/24 166/265 |
| 2009/0020481 | A1 | 1/2009 | Bailie et al. | |

FOREIGN PATENT DOCUMENTS

| | | |
|---|---|---|
| DE | 4005520 A1 | 8/1991 |
| EP | 0159885 A2 | 10/1985 |
| EP | 2891630 A1 | 7/2015 |
| EP | 33037148 A1 | 6/2016 |
| FR | 1381770 A | 12/1964 |
| WO | 85/04470 A2 | 10/1985 |
| WO | 2004/020066 A1 | 3/2004 |

OTHER PUBLICATIONS

Written Opinion dated Dec. 7, 2017 from International Application No. PCT/AU2017/050804 (Authorised officer, Keiara Moodley), 6 pages.

Extended European Search Report for corresponding European Patent No. 17844669.6 dated Mar. 26, 2021, 9 pages.

\* cited by examiner

EVAPORATOR

CROSS-REFERENCE TO RELATED APPLICATIONS

This application is a U.S. National Stage application of PCT/AU2017/050804 filed 1 Aug. 2017, the entire disclosure of which is hereby incorporated by reference in their entirety.

FIELD OF THE INVENTION

This invention relates to a water purification plant which removes impurities by evaporating and condensing potable water and leaving waste residue.

BACKGROUND OF THE INVENTION

One of the most commonly used methods of purifying water is by passing a feed stream through reverse osmosis filters and producing a potable stream free of impurities and a concentrated waste stream. However this method is limited to feed streams containing at most 4% of impurities and cannot deal with higher concentrations.

Accordingly there is a need for a method which is able to produce potable water from feed streams with higher concentrations of impurities. However previous attempts to do this have been costly because of energy consumption and maintenance to remove scaling and a more efficient method is required for large scale use.

Reference to cited material or information contained in the text should not be understood as a concession that the material or information was part of the common general knowledge or was known in Australia or any other country.

SUMMARY OF THE INVENTION

According to a first embodiment, the present invention provides a process for separating distillate and waste from a water stream comprises:

spraying the water stream together with compressed steam through one or more dual phase nozzles down into one or more vertical tubes contained in a shell and tube heat exchanger;

evaporating the water condensing the distillate; and ejecting the waste.

Preferably the distillate is passed through a plate heat exchanger to pre heat the water stream.

Preferably the steam is sucked from the shell and tube heat exchanger tubes into a compressor which supplies the super-heated compressed steam to the shell and tube heat exchanger.

Preferably, the waste at least partially comprises solids.

Preferably, at least some of the condensed distillate is made available for reuse.

Preferably, at least one fin is attached to the one or more vertical tubes.

Preferably, the at least one fin spirals around a vertical tube.

In accordance with a second embodiment of the present invention, there is provided a device for separating distillate and waste from a water stream including:

a plate heat exchanger arranged to receive a water stream, heat the water stream and feed the water stream to a first manifold;

a shell and tube heat exchanger including one or more vertical tubes, the shell and tube heat exchanger being arranged to receive the water stream from the first manifold and expand the water to release steam and solid waste; and a mist eliminator arranged to filter the steam and feed it through a compressor and into a steam manifold;

wherein the steam manifold is arranged to feed the steam into the shell and tube heat exchanger.

Preferably, at least one fin is attached to an outside surface of the one or more vertical tubes.

Preferably, the at least one fin is arranged to spiral around the outside surface of the at least one or more vertical tubes.

Preferably, a sleeve is inserted into each of the at least one or more vertical tubes.

Preferably, the sleeve includes a flange at an upper end of the sleeve.

Preferably, a ring extends across the shell and tube heat exchanger.

Preferably, the ring includes a plurality of apertures and the sleeve is arranged to be received within one of the plurality of apertures.

Preferably, the ring is arranged to be removed from the shell and tube heat exchanger and the sleeve is arranged to be removed with the ring.

BRIEF DESCRIPTION OF THE FIGURES

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DETAILED DESCRIPTION OF THE PREFERRED EMBODIMENTS

Figure 1:
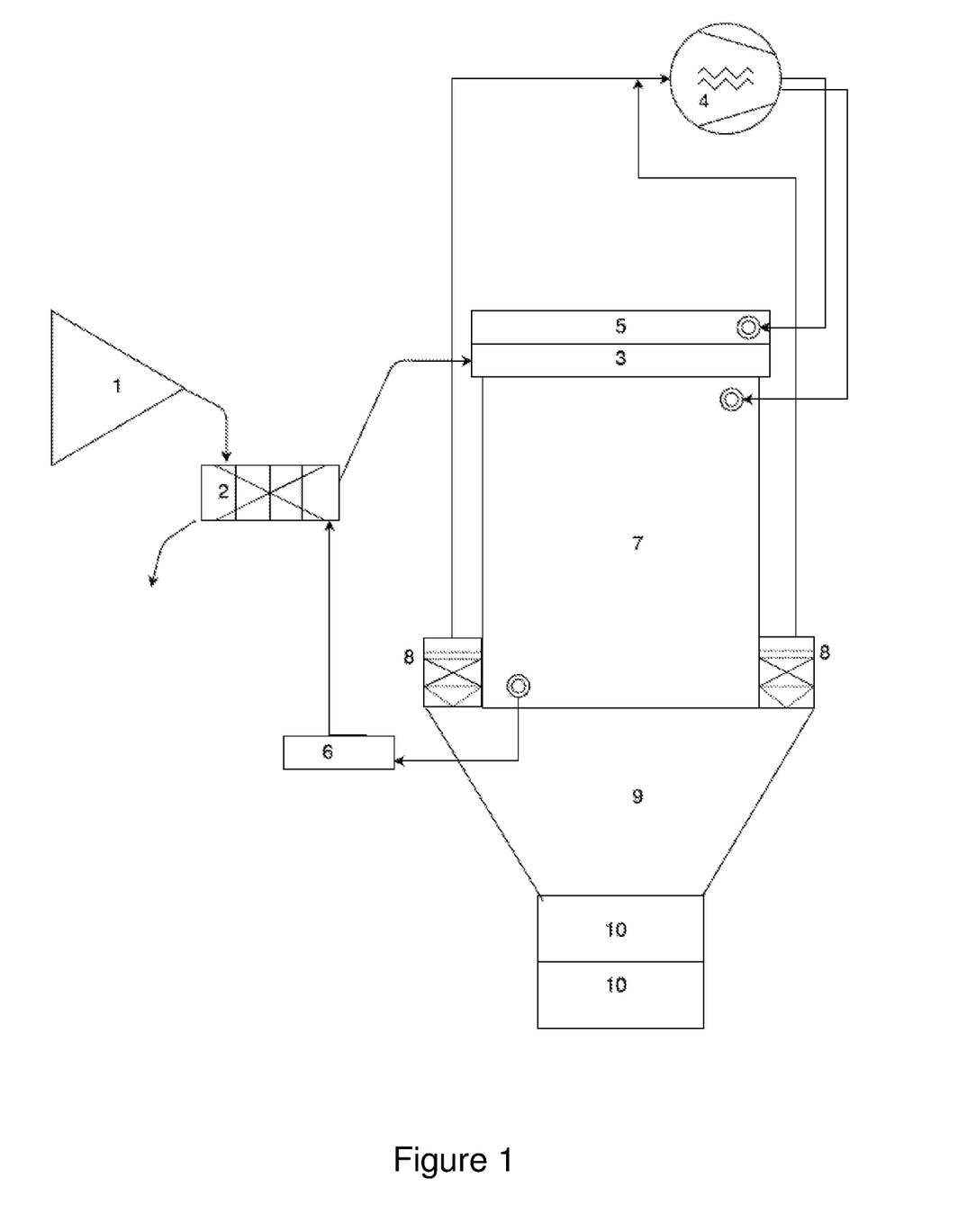
FIG. 1 is a schematic illustrating an embodiment of a shell and tube heat exchanger of the present invention.
Figure 2:
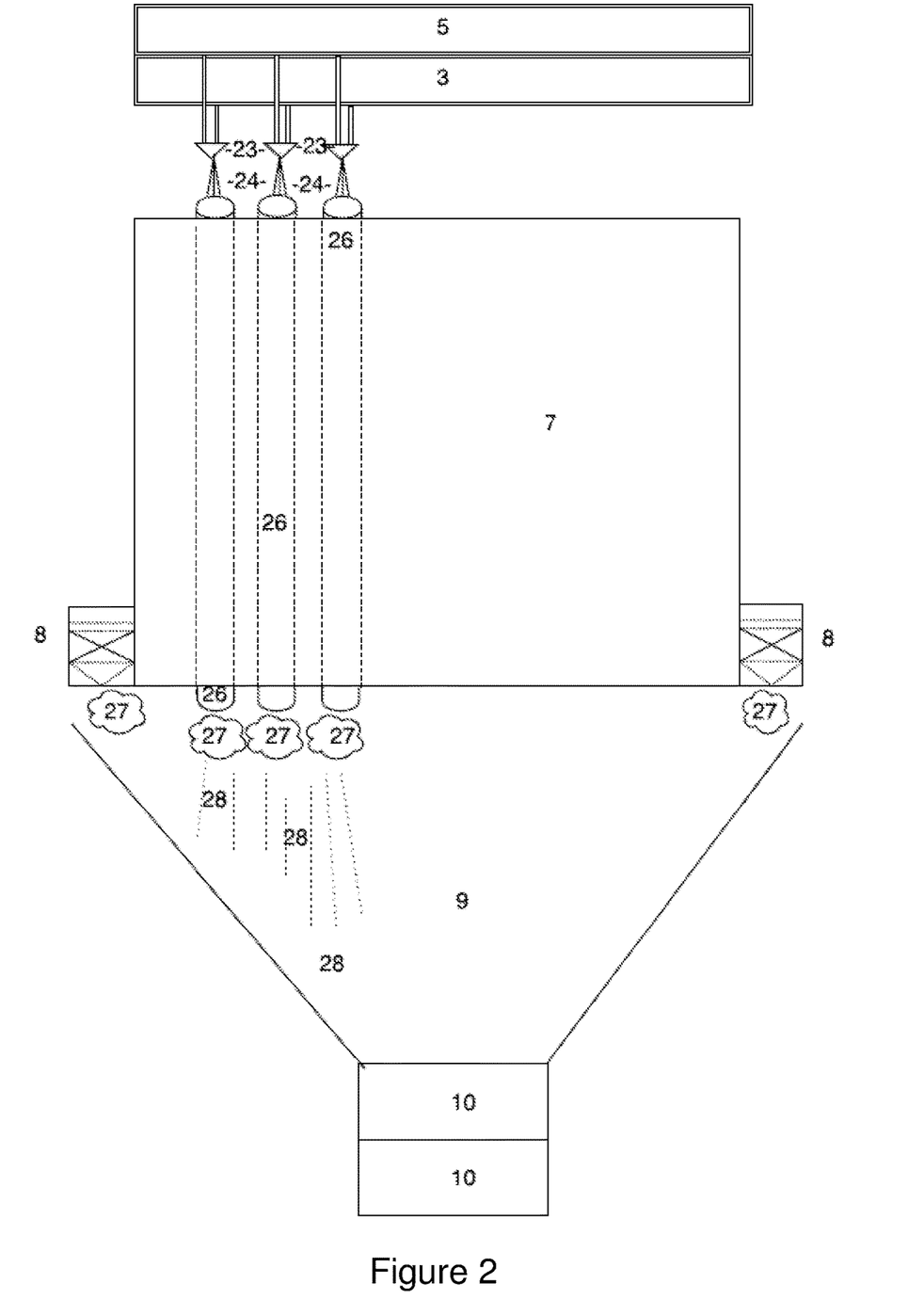
FIG. 2 shows the detail of the dual phase nozzles and manifolds and the shell and tube heat exchanger of FIG. 1.

With reference to FIGS. 1 and 2, a first embodiment of the present invention is illustrated where a filtered water stream 1 is fed into plate heat exchanger 2 at ambient temperature. The plate heat exchanger 2 raises the water stream's temperature to about 99° C. From the plate heat exchanger 2 the water is then fed to water manifold 3 and steam is fed from compressor 4 into steam manifold 5. Additionally, steam from compressor 4 is fed into the shell of shell and tube heat exchanger 7.

Both water manifold 3 and steam manifold 5 feed into dual phase nozzles 23 which spray super-heated feed water and steam 24 into vertical tubes 26 of shell and tube heat exchanger 7. This causes rapid expansion of feed water into steam 27 with the release of solid waste 28. Steam from shell 7 is condensed by trap 6 and the distillate is fed back through plate heat exchanger 2 and delivered at ambient temperature.

Mist eliminators 8 filter remaining steam 27 and it is extracted by and recycled to compressor 4. Waste is collected in output 9 which attaches to two stage hopper 10 which utilizes reciprocating dump cups to ensure neither loss of steam nor air suction to output 9.

Solid waste 28 is discharged from tubes 26 through collector chute 9 into dual waste disposal system 10 which prevents steam losses from the system and air from entering the system by utilising reciprocating dump cups (not shown).

Accordingly by retaining and recycling energy the above provides an energy efficient system for removing high concentrations of impurities from water by evaporation. Shell and tube heat exchanger 7 with dual phase spray nozzles 24 are the key components of this evaporation process.

Figure 3:
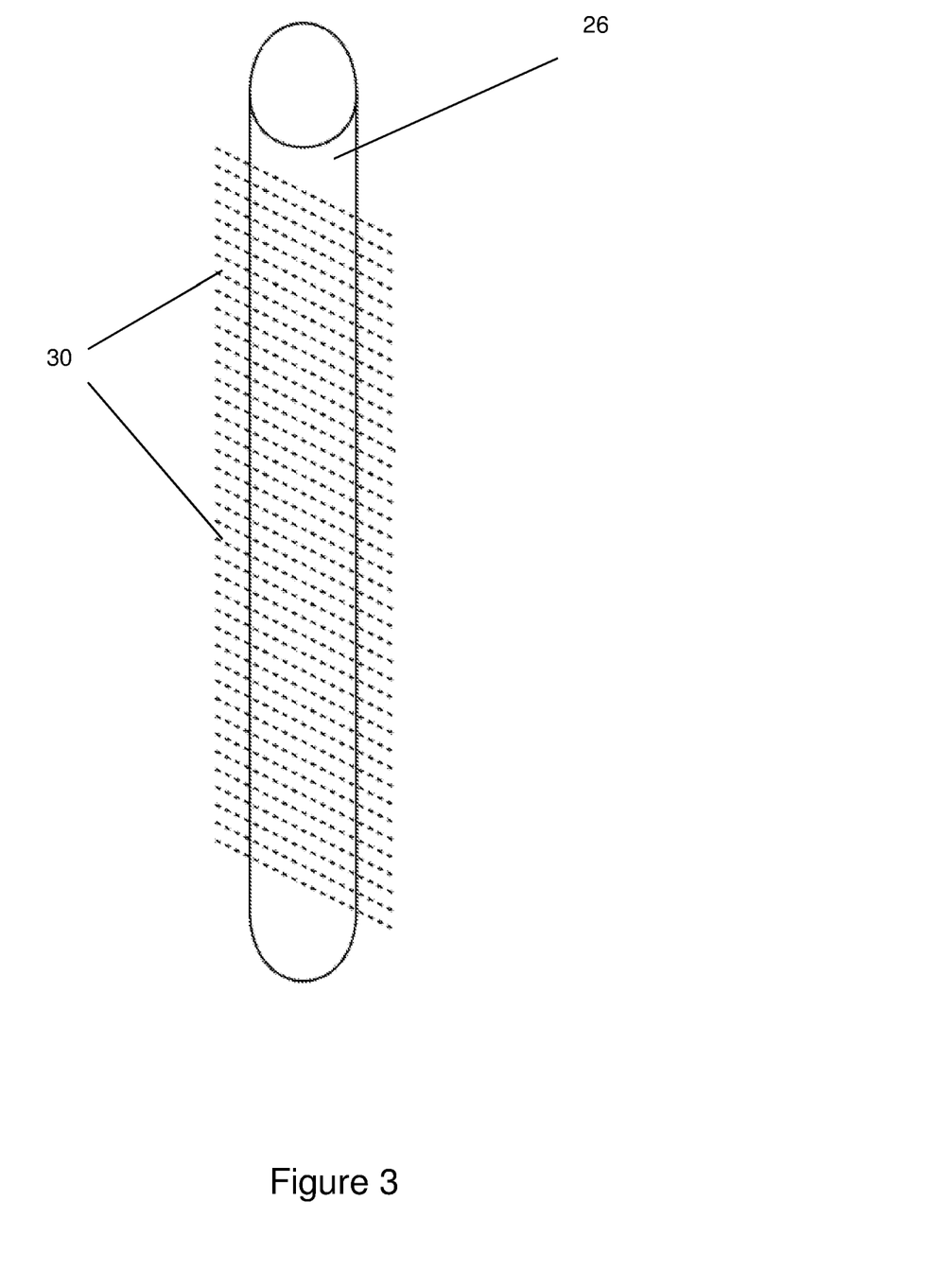
FIG. 3 is a perspective view of a vertical tube used in an embodiment of the present invention.
Figure 4:
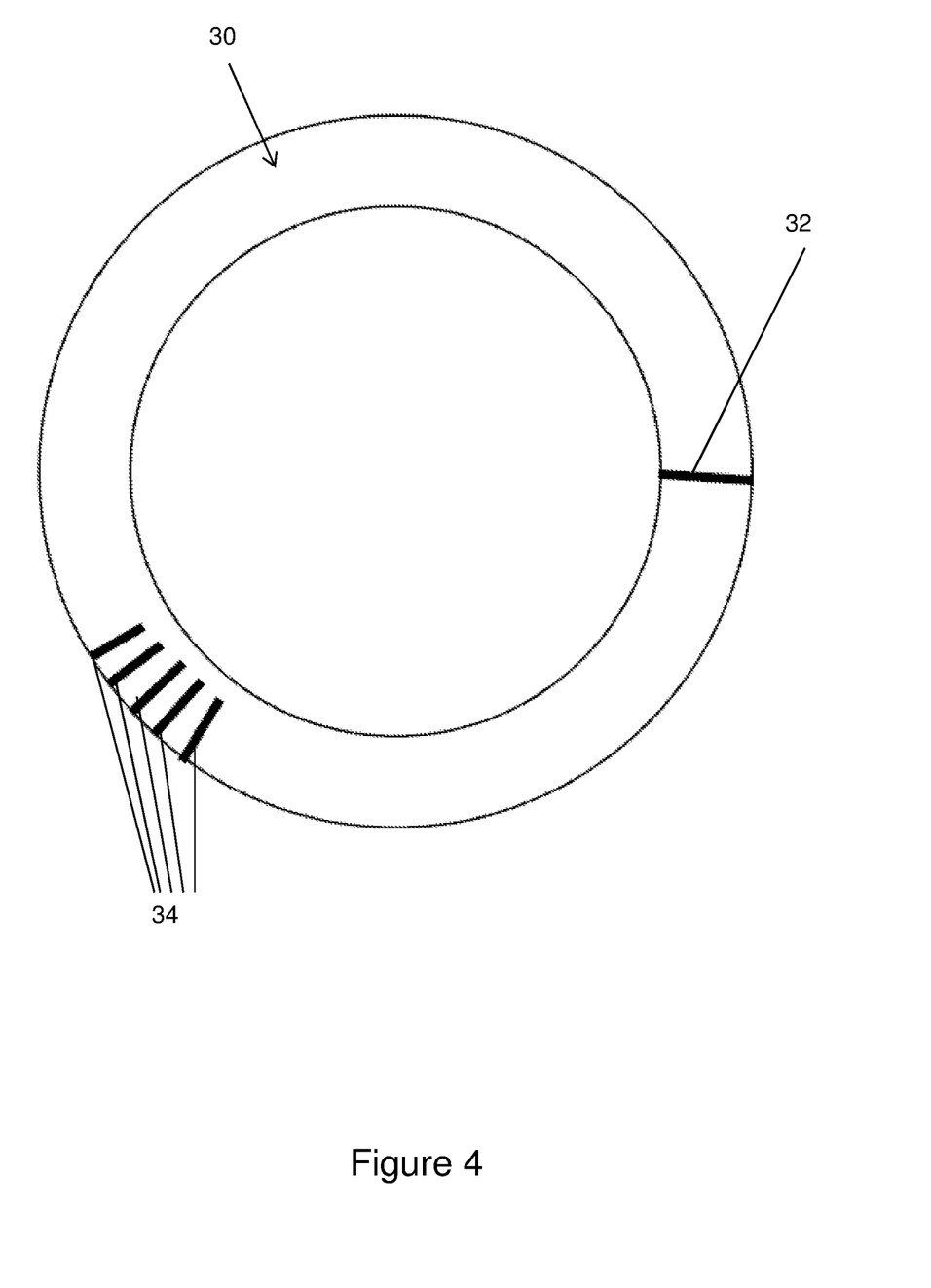
FIG. 4 is a cross plan view of the vertical tube of FIG. 3.

A second embodiment of the invention is illustrated in FIGS. 3 and 4. For convenience features of the second embodiment that are similar or correspond to features of the first embodiment have been referenced with the same reference numerals.

In the second embodiment, vertical tubes 26 are attached to spiral fins 30. The spiral fins 30 add greater surface area to the vertical tubes 26 to assist with heat transfer. The spiral fins 30 are made of a heat conductive material such as metal. In the embodiments where the spiral fins 30 are made of metal they are welded to the vertical tubes 26.

In addition to creating a greater surface area for heat to transfer over, the spiral fins 30 provide a convection path that increases the capacity of the heated steam to transfer more energy over the increases surface area.

With the greater heat transfer provided with the fins, higher temperatures can be put into the water increasing the volumetric throughput of the system.

As superheated steam typically acts as a self-insulator, due to its poor conducting properties, the increase surface area provided by the spiral fins 30 improves the heat transfer by reducing the steam to steam particle interaction.

Whilst the spiral fins 30 are described and illustrated as being arranged in a spiral, the skilled addressee will recognise that the fins do not need to be arranged in a spiral.

With reference to FIG. 4, in one embodiment, the spiral fins 30 are made up of a plurality of rings that are spliced together at splice point 32. The joined rings are then laid around the outside perimeter of the vertical tubes 26 and welded to the vertical tubes 26 to form the spiral.

In one embodiment, slots 34 are cut into the spiral fin 30.

Figure 5:
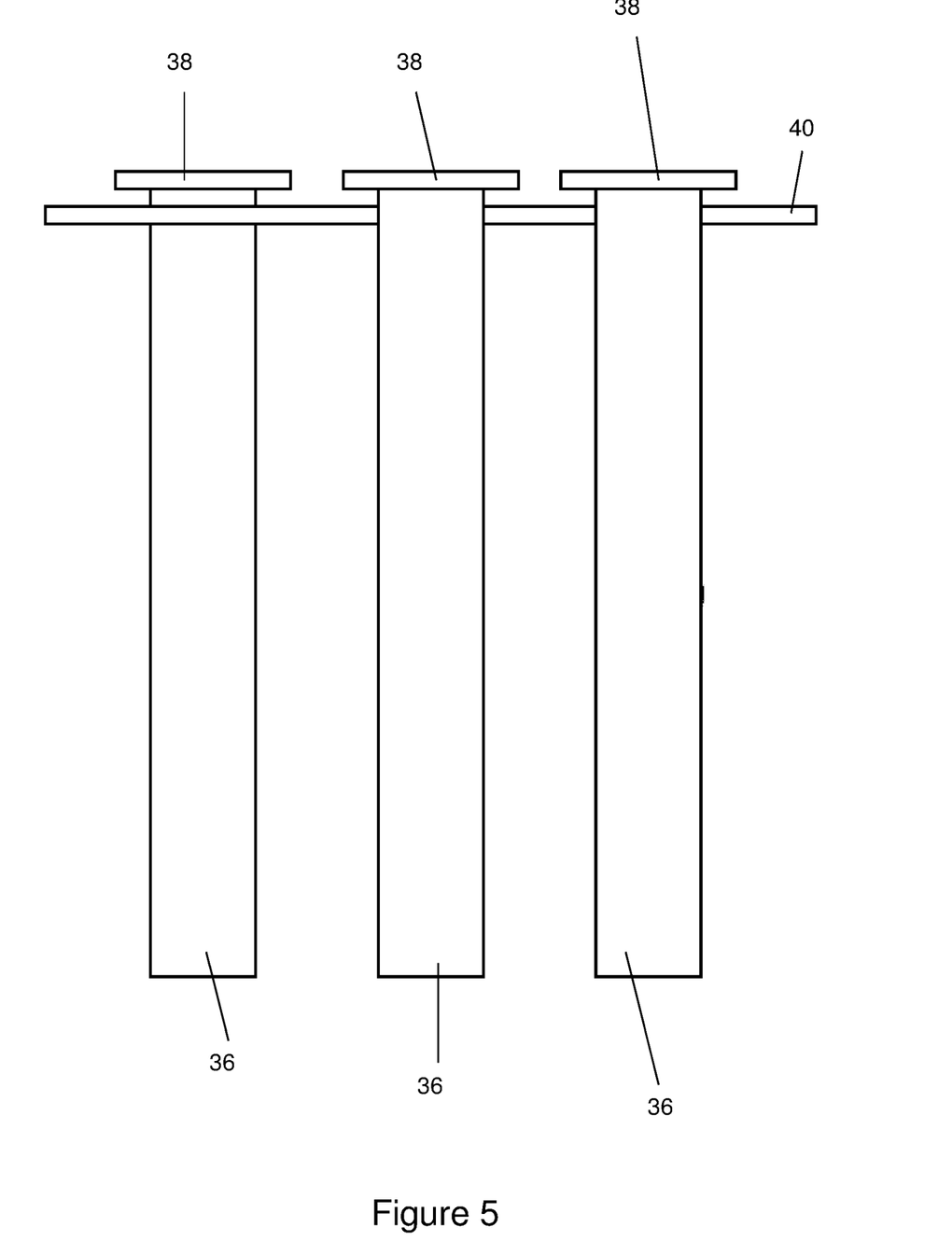
FIG. 5 is a side view of a sleeve tube used in an embodiment of the present invention.
Figure 6:
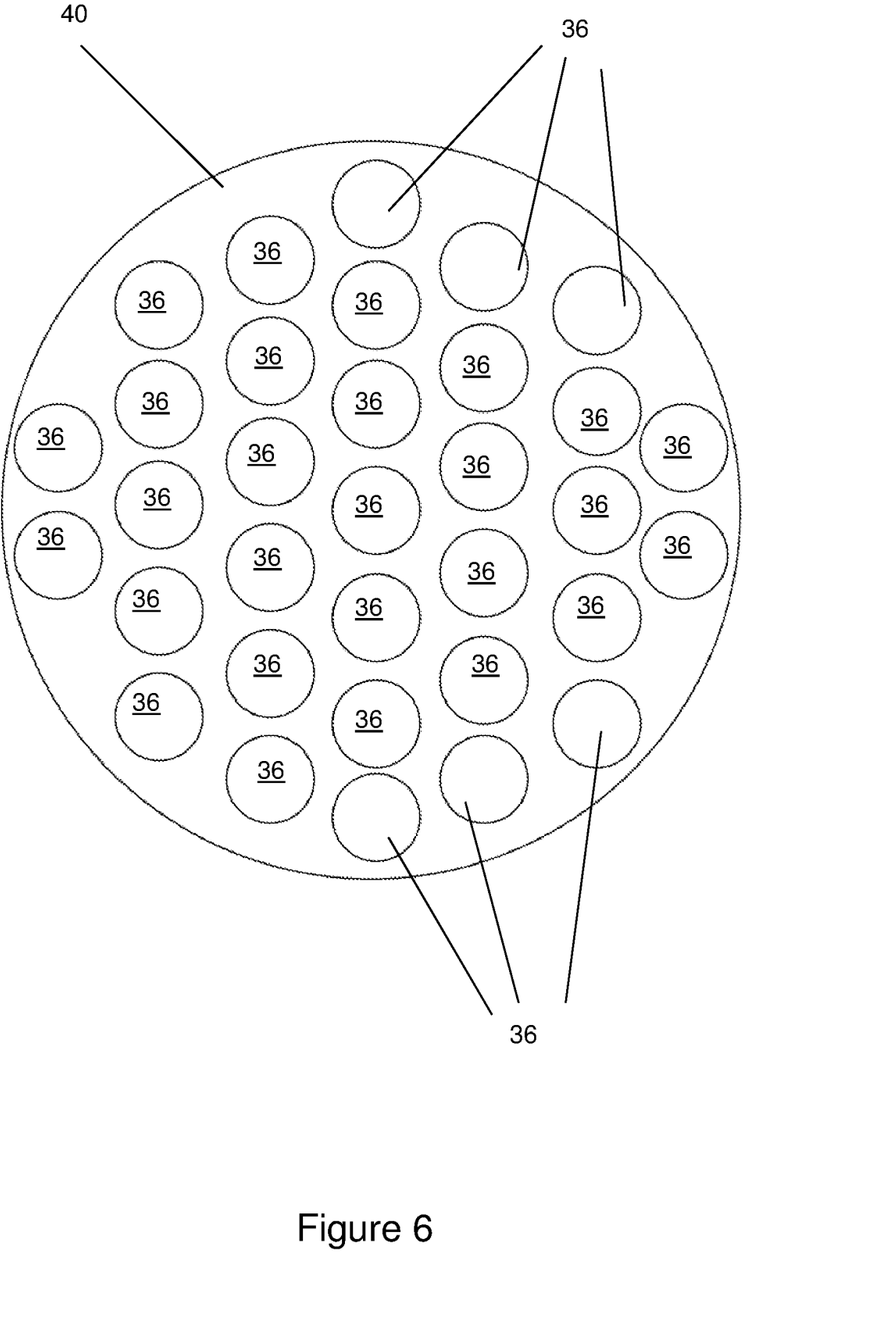
FIG. 6 is a ring for use in the shell and tube heat exchanger of the present invention of the present invention.

A third embodiment of the invention is illustrated in FIGS. 5 and 6. For convenience features of the first and second embodiments that are similar or correspond to features of the third embodiment have been referenced with the same reference numerals.

With reference to FIGS. 5 and 6, wet sleeves 36 are arranged to be inserted into the vertical tubes 26. The wet sleeves 36 are designed to collect any scale that would otherwise accumulate on the vertical tubes 26 over time instead of the vertical tubes 26 collecting the scale. The wet sleeves 36 include a flange 38 at the top of the wet sleeve 36.

A ring plate 40 extends across the cross section of the shell and tube heat exchanger 7. The ring plate 40 includes a plurality of apertures arranged to align with the vertical tubes 26. The apertures are also arranges to receive the wet sleeves 36 through them to place the wet sleeve 36 into the vertical tubes 26. The flange 38 is larger than the apertures so that the wet sleeve 36 hangs from the ring plate 40 into the vertical tubes 26. To remove the wet sleeves 36 for cleaning the ring plate is lifted out of the shell and tube heat exchanger 7. This can be done with a crane, overhead gantry or otherwise as understood by the skilled addressee.

In circumstances where scaling is likely to occur the wet sleeves 36 mean that the entire shell and tube heat exchanger 7 does not need to be removed for cleaning, improving maintenance downtime and costs.

Alterations and Modifications to the Embodiments

Modifications and variations such as would be apparent to the skilled addressee are considered to fall within the scope of the present invention. The present invention is not to be limited in scope by any of the specific embodiments described herein. These embodiments are intended for the purpose of exemplification only. Functionally equivalent products, formulations and methods are clearly within the scope of the invention as described herein.

Throughout this specification, unless the context requires otherwise, the word "comprise" or variations such as "comprises" or "comprising", will be understood to imply the inclusion of a stated integer or group of integers but not the exclusion of any other integer or group of integers.

Any reference to prior art contained herein is not to be taken as an admission that the information is common general knowledge, unless otherwise indicated.

The invention claimed is:

1. A process for separating distillate and waste comprising at least partially dissolved solids from a water stream comprising:
   spraying the water stream together with a compressed steam through one or more dual phase nozzles down into one or more vertical tubes contained in a shell and tube heat exchanger;
   evaporating the water stream to produce an evaporate, compressing the evaporate and condensing the evaporate to form a distillate;
   ejecting the waste from the bottom of the one or more vertical tubes; and
   passing the compressed steam over spiral fins attached to the outer surface of the one or more vertical tubes to produce a condensate/distillate.

2. The process of claim 1, wherein the spiral fins include slots.

3. The process of claim 2, wherein a small percentage of the evaporate is diverted to the dual phase nozzles.

4. The process of claim 1, wherein the distillate is passed through a plate heat exchanger to pre heat the water stream.

5. The process of claim 4, wherein the plate heat exchanger is arranged to receive the water stream, heat the water stream to become a super-heated feed water and feed the super-heated feed water to a first manifold.

6. The process of claim 1, wherein the evaporate is sucked from the one or more vertical tubes of the shell and heat exchanger into a compressor which recycles the evaporate to become the compressed steam to the one or more vertical tubes of the shell and tube heat exchanger and passing the evaporate over the spiral fins.

7. The process of claim 1, wherein at least some of the distillate is fed into a plate heat exchanger to preheat the water stream.

8. A device for separating distillate and waste from a water stream including:
   a plate heat exchanger arranged to receive a water stream, heat the water stream to become a super-heated feed water and feed the super-heated feed water to a first manifold;
   a shell and tube heat exchanger including at least one or more vertical tubes, the shell and tube heat exchanger being arranged to receive the super-heated feed water from the first manifold via dual-phase nozzles and expand the water into a mist onto the inside of the one or more vertical tubes to release a steam and a waste; and a mist eliminator arranged to filter a first portion of the steam and feed the first portion of the steam through a compressor to divert a first part of the first portion of the steam to the shell and tube heat exchanger and a second part of the first portion of the steam to a steam manifold;

wherein the steam manifold is arranged to feed the second part of the first portion of the steam into the dual-phase nozzles; and wherein at least one fin is attached to an outside surface of the one or more vertical tubes.

9. The device as claimed in claim 8, wherein the at least one fin includes slots.

10. The device as claimed in claim 8, wherein the at least one fin is arranged to spiral around the outside surface of one of the at least one or more vertical tubes.

11. The device as claimed in claim 8, including a sleeve arranged to be inserted into the at least one or more vertical tubes.

12. The device as claimed in claim 11, wherein the sleeve includes a flange at an upper end of the sleeve.

13. The device as claimed in claim 12, including a ring extending across the shell and tube heat exchanger.

14. The device as claimed in claim 13, wherein the ring includes a plurality of apertures and wherein the sleeve is arranged to be received within one of the plurality of apertures.

15. The device as claimed in claim 14, wherein the ring is arranged to be removed from the shell and tube heat exchanger and wherein the sleeve is arranged to be removed with the ring.

* * * * *